Figure 1:
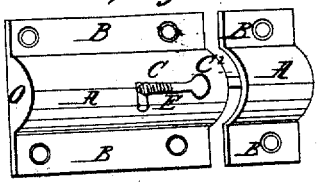
Figure 2:
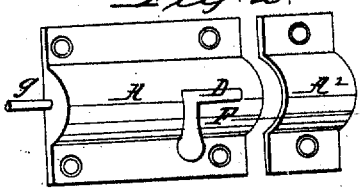

9752X

M. Merriman,

Spring Bolt.

Patented June 20, 1836.

9752X June 20, 1836

Marcus Merriman, New Haven, New Haven County, Conn.

Letters Patent

The schedule referred to in these Letters Patent and making part of the same
containing a description in the words of the said Marcus Merriman him-
self of his Improvement in the Spiral Spring Bolt for fastening window sashes
and doors and for other purposes.

To all to whom these presents shall come Be it known that I, Marcus Merri-
man Jr of New Haven in the County of New Haven in the State of Connecticut
have invented a new and useful improvement in the spring bolt for fastening
window sashes & doors and for other purposes and that the following is a full
& exact description thereof. My improved spring bolt consists of the following
parts viz. The bolt and thumb piece with a spiral spring in common form
and a concave semi cylindrical shell covering the spring & bolt in which they play.
They are all made of brass or any other suitable
metal & may vary proportionally in size from one to twelve inches in length
according to the use intended. The size for ordinary sash fastening requires a
shell of about one and an half inches in length. The shell is closed at both
ends except an orifice in one end for the head of the bolt & in the other for
the shank of the bolt to play in. On the sides of the shell are flanges with holes
for screws to secure it in place. On the top of the shell is a groove for the neck
of the thumb piece to slide in commencing the thickness of the shell back
of the front & extending back as far as the head of the bolt projects.
The groove then turns at right angles & forms
a notch for the neck of the thumb piece made a little hollowing towards the
front. The bolt is as much longer than the shell as it projects beyond it.
The head is made round terminating in a shank of less size and of about
half the length of the bolt. When the bolt is in place it plays thro' the orifice
in the ends of the shell. On the shank of the bolt is placed a spiral spring which
by pressing between the end of the shell and the shoulder of the head projects it
forward till checked by the neck of the thumb piece at the end of the groove.

the neck passing loosely through the guide is firmly riveted to the bolt so as thereby to limit the expansion of the spring and projection of the bolt.

The object intended and effected by this improvement is that when the bolt is drawn back & the neck of the thumb-piece is turned into the notch it is there held fast by the force of the spring till unlocked. This bolt is peculiarly adapted to fasten window sashes when shut & in place. Being attached to the top rail of the lower sash and the bolt entering a notch of similar shape with the staple on the top of the lower rail of the upper sash, both are made fast. & by locking the bolt back in the notch of the guide as above described, both sashes are free to be raised or lowered without obstruction from the bolt. For further illustration I refer to the models & drawings thereof deposited in the Patent office.

What I claim as my invention and not previously known is the application of the side notch to spiral spring bolts, the combination of the several parts, in the manner and for the purposes above specified: By means of which a spiral spring bolt when drawn back may be readily & easily locked & secured in place. I therefore solicit Letters Patent, April 22 1836

Marcus Merriman Jr.

Witnesses
Exd. Simeon Baldwin
[illegible] Ebenezer Baldwin

Drawing | 690 words